(No Model.) 2 Sheets—Sheet 2.
W. P. CLARK.
DRAFT TUBE FOR EFFERVESCING DRINKS.
No. 358,650. Patented Mar. 1, 1887.
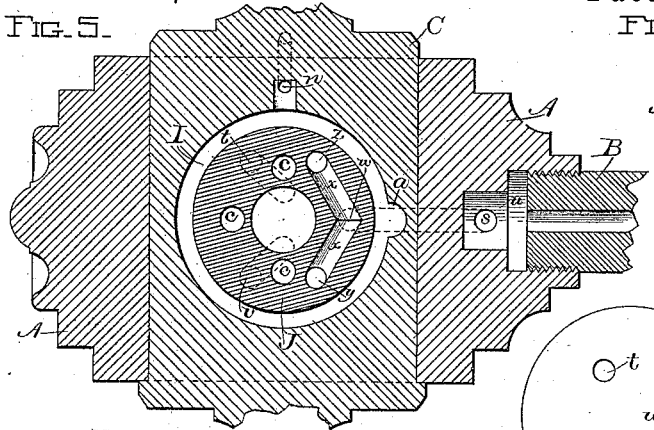
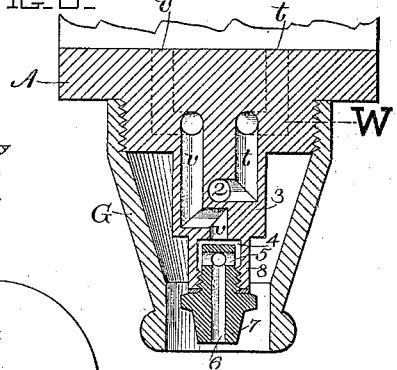
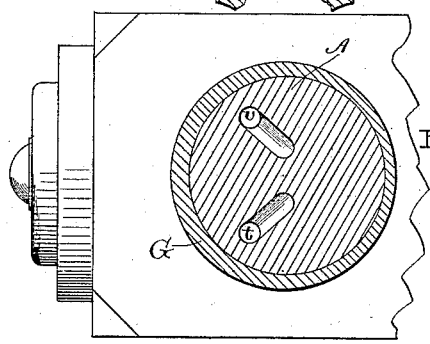
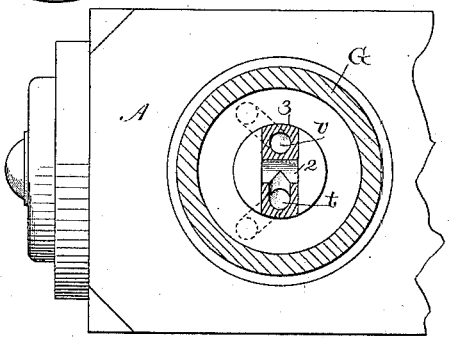
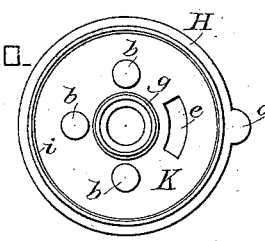
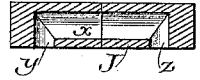
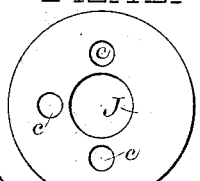
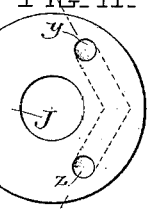
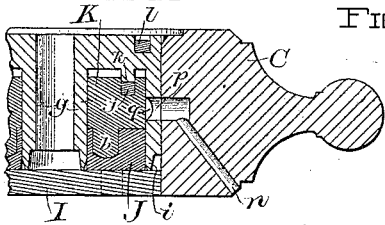
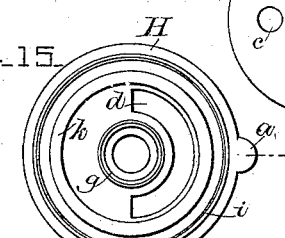
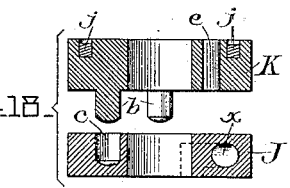
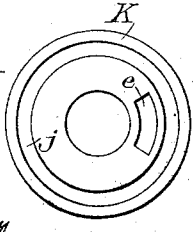
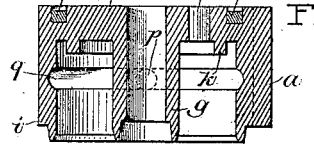
WITNESSES
A. C. Crane
Eugene Humphrey
INVENTOR
William P. Clark
per T. W. Porter, Atty.

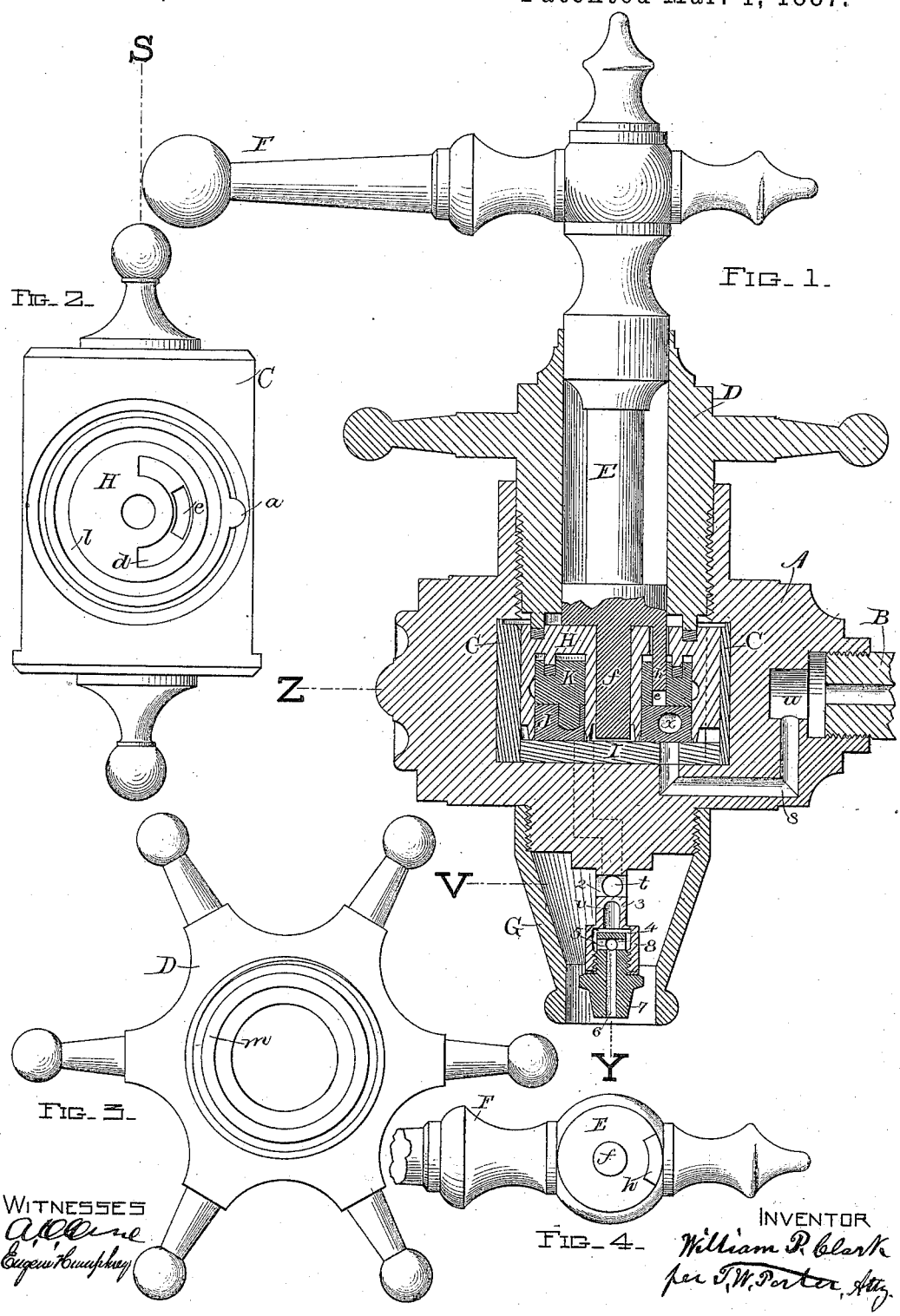

UNITED STATES PATENT OFFICE.

WILLIAM P. CLARK, OF MEDFORD, MASSACHUSETTS.

DRAFT-TUBE FOR EFFERVESCING DRINKS.

SPECIFICATION forming part of Letters Patent No. 358,650, dated March 1, 1887.

Application filed October 14, 1885. Serial No. 179,833. (No model.)

*To all whom it may concern:*

Be it known that I, WILLIAM P. CLARK, of Medford, in the county of Middlesex and State of Massachusetts, have invented a new and useful Improvement in Draft-Tubes for Effervescing Drinks and other Liquids, which will, in connection with the accompanying drawings, be hereinafter fully described, and specifically defined in the appended claims.

Figure 1 is a vertical central section through my improved tube, taken in a plane passing through the axis of the supply-pipe, and showing the actuating-key partly in elevation. Fig. 2 is a top plan view of the holder of the valve and packing, the valve, its case, and the valve-carrier being shown in place therein. Fig. 3 is an inverted plan view of the gland. Fig. 4 is an inverted plan view of the valve-actuating key. Fig. 5 is a horizontal section taken on line Z Z, Fig. 1, and showing the packing in plan between the inner wall of the valve and packing-holder and the periphery of the valve, the valve-case being removed. Fig. 6 is a central section, taken as on line Y, Fig. 1, through the lower portion of the draft-tube. Fig. 7 is a sectional plan view, the section being taken as on line W W, Fig. 6, and the view as from below. Fig. 8 is a sectional plan view, the section being taken as on line V V, Fig. 1, and the view as from below that line. Fig. 9 is a plan view of the packing, showing the respective passages through the same. Fig. 10 is an inverted or under side plan view of the valve-case with the valve-carrier seated therein, but with the valve removed. Fig. 11 is an inverted or under side plan view of the valve. Fig. 12 is a vertical section taken on line T, Fig. 11, and viewed as from the right therein, but with the valve as in normal position. Fig. 13 is a top plan view of the valve, showing the holes that receive the pins of the valve-carrier. Fig. 14 is a vertical section taken on line S, Fig. 2, through a part of the valve and packing-holder, the packing, the valve, the valve-carrier, and the valve-case, and showing the leakage tell-tale passage through the valve-case and valve and packing-holder. Fig. 15 is an inverted plan view of the valve-case. Fig. 16 is a top plan view of the carrier. Fig. 17 is a vertical section on line R, Fig. 15, through the valve-case. Fig. 18 is a detached section showing the valve and valve-carrier as in Fig. 1, but slightly separated.

My invention relates to draft-tubes of apparatus from which various effervescing and other drinks are drawn; and it consists in features of novelty hereinafter fully described, and pointed out in the claims.

Referring to the drawings, A represents the body of the draft-tube, which is supported upon the conduit tube or arm B, extending from the fountain or apparatus. A rectangular bar or holder, C, termed the "valve and packing-holder," is seated in an open slot extending through body A. In the upper portion of body A is screw-threaded the gland D, provided with a series of radial arms by which to actuate it. A valve-actuating key, E, having a lever, F, is arranged axially in said gland. To the bottom of body A is secured the funnel-shaped nozzle G. In a central passage through holder C is seated the valve-case H, which is interlocked in holder C by a longitudinal rib, *a*, which is seated in a corresponding side recess or slot in the holder, as shown in Figs. 1, 2.

In the bottom of the opening of holder C is seated the disk-like packing I, which is interlocked by its projection *a* in the same manner as is valve-case H. Upon packing I, and within case H, is seated the valve J, while directly above it is the valve-carrier K, whose fins *b*, seated in holes *c* in the valve, cause the latter to rotate with the carrier, said carrier and valve being perfect disks to rotate in case H, and having each a central passage to receive the sleeve *g* of said case. In the top of said case is formed the arc-like or semicircular slot *d*, which extends entirely through the top, as shown in Figs. 1, 2, while through valve-carrier K is formed a shorter but similar slot, *e*. Upon the lower end of key E is an axial pin, *f*, which fits in the central passage in case H, and there is also formed on said key, at one side of said pin, an arc-like stud, *h*, which passes through curved slot *d* in case H and enters slot *e* in carrier K, as shown in Fig. 1, filling said slot; and by actuating the key by its lever F the carrier and valve may be reciprocated in a rotary path to the extent permitted by the longer slot *d* in the case.

The disk I, of leather or other suitable material, seated between the lower internal face of the slot through body A and the valve J, serves to pack the face of the valve, while the circumferential wall *i* of case H, which is by the action of gland D forced against disk I, serves to form a liquid-tight joint around the valve, and the similar contact of sleeve $g$ forms a like joint around pin $f$ of key E. A concentric rim or lip, $k$, in the top of case H is seated upon the ring-packing $j$ in carrier K, and a concentric lip, $m$, upon the lower face of gland D is seated upon the ring-packing $l$, inserted in said case, as shown in Fig. 1, the packing-ring $j$ serving to prevent wear and friction when the valve is actuated by the key, and packing $l$ performing the same office when the gland is rotated to seat the valve upon its packing-disk with due force and pressure.

In Fig. 14 is shown a passage, $n$, in holder C, which communicates with passage $p$ through the vertical wall of case H, which connects with a circular recess, $q$, therein, said passages serving to indicate by the dripping from passage $n$, in case of defective packing, that such defect exists.

Having thus described the construction of the body of the tube, the valve, and coacting parts, I will next describe the conduits or passages which are opened and closed by means of the valve and by which the fluid is delivered into the drinking-vessels. The inlet-passage $s$ in body A communicates with a small chamber, $u$, at the inner end of supply-pipe B, and with the inlet-passage $w$ in packing I, as shown in Fig. 1. In said packing are also formed two outlet-holes, (marked $t$ and $v$, respectively,) which respectively communicate with passages correspondingly marked and formed in body A below said packing, said passage $t$ being the outlet for the large or spraying stream, and passage $v$ for the small or "sharp" stream, as it is termed, (the connection of said passages $t$ $v$ with the delivery-nozzles being hereinafter stated.)

In the lower side of valve J are two holes, $y$ $z$, connected by passage $x$, formed in the body of the valve, said holes being so positioned that when lever F of key E is moved to its extreme limit in one direction hole $y$ will be coincident with inlet-passage $w$ in packing I, and hole $z$ will be coincident with hole $v$ in said packing, and the fluid entering the valve through hole $y$ will pass out through hole $z$ in the valve, and through the hole $v$ in the packing and in body A, and will be delivered as the sharp stream; but when lever F is moved to its opposite limit hole $z$ is coincident with inlet $w$ and hole $y$ is coincident with hole $t$ in the packing and in body A, and the liquid entering the valve through hole $z$ will be delivered through passage $t$ as the large or spraying stream. The liquid which enters passage $t$ from the valve, as described, descends the same, as shown, and is delivered inside nozzle G through cross-passages 2 in the flattened neck-like portion 3, as is shown in Figs. 1, 6, and the liquid that enters passage $v$ descends the same, as shown, and enters the small chamber 4 in portion 8, whence it passes by cross-passages 5 into axial passage 6 in nozzle 7, whence it is delivered as the sharp stream; but said delivery devices shown below said passages $t$ and $v$ are not herein claimed as new, as they, in part at least, constitute features of a former invention secured to me by United States Patent No. 138,615, issued May 6, 1873; and I do not herein broadly claim a holder, C, which is insertible and removable from the outside of body A, as the same is patented to me in United States Patents Nos. 222,869, 248,918, and 257,472, and respectively dated December 23, 1879, November 1, 1881, and May 9, 1882.

What I claim as my invention is—

1. The combination, with a draft-tube, of removable holder C and a valve seated within the holder and constructed and arranged to be inserted within and withdrawn from the draft-tube by and with said holder, and provided with means by which to actuate it, substantially as specified.

2. The combination, with a draft-tube, of a valve-holder seated therein, a valve arranged in said holder, and a valve-case interlocked in said holder and inclosing the valve, substantially as specified.

3. The combination of a valve adapted to be rotated, a disk-like carrier removably interlocked with said valve to insure coincident movement thereof, and a rotating key interlocked with said carrier, whereby the valve is rotated by the key through its action upon the carrier, substantially as specified.

4. The combination of holder C, the valve-case interlocked therein, the valve inclosed in said case, and the valve-actuating key, all substantially as specified.

5. The combination, with the packing-disk, of the valve and the valve-case with its internal sleeve, and an actuating-rod formed to interlock with the valve-case, substantially as specified.

6. The combination, with body A, having inlet-passage $s$ and outlet-passages $t$ and $v$, of packing I, having passages coincident with said passages in the body, and valve J, having holes $y$ $z$, united by passage $x$ and positioned to respectively serve as either the inlet or outlet passage, according as the valve is actuated, substantially as specified.

7. The combination, with the valve-carrier, the valve-case, and the gland, of yielding ring $j$, the concentric lip $k$, ring $l$, and concentric lip $m$, respectively formed, combined, and arranged substantially as specified.

8. The combination, with holder C, the valve and valve-case therein arranged and duly packed, of tell-tale passage $p$ in said shell, and the coincident passage $n$ in said holder, arranged to indicate the leakage resulting from imperfect packing, substantially as specified.

WILLIAM P. CLARK.

Witnesses:
EUGENE HUMPHREY,
T. W. PORTER.